(12) United States Patent
Hirayama et al.

(10) Patent No.: US 7,939,004 B2
(45) Date of Patent: May 10, 2011

(54) PRESSING BAG AND ITS PRODUCTION METHOD, AND METHOD FOR PRODUCING COMPOSITE BODY USING SUCH PRESSING BAG

(75) Inventors: Akira Hirayama, Saitama-ken (JP); Masaki Kobayashi, Saitama-ken (JP)

(73) Assignee: Honda Motor Co., Ltd., Tokyo (JP)

(*) Notice: Subject to any disclaimer, the term of this patent is extended or adjusted under 35 U.S.C. 154(b) by 878 days.

(21) Appl. No.: 11/339,515

(22) Filed: Jan. 26, 2006

(65) Prior Publication Data
US 2006/0170127 A1 Aug. 3, 2006

(30) Foreign Application Priority Data

Feb. 2, 2005 (JP) .................................. 2005-026604

(51) Int. Cl.
*B29C 67/24* (2006.01)
(52) U.S. Cl. ... 264/316; 264/319; 264/330; 264/331.11; 156/285; 156/286; 156/304.3; 156/304.1
(58) Field of Classification Search .................. 264/571, 264/316, 257, 102, 152, 331.11; 425/383, 425/389; 156/264, 265, 297, 157, 304.1, 304.3, 285, 286
See application file for complete search history.

(56) References Cited

U.S. PATENT DOCUMENTS

| | | | | | |
|---|---|---|---|---|---|
| 4,824,631 | A | * | 4/1989 | Yeager | 264/552 |
| 5,641,525 | A | * | 6/1997 | Yakel | 425/390 |
| 5,746,961 | A | * | 5/1998 | Stevenson et al. | 264/255 |
| 6,257,858 | B1 | | 7/2001 | Pabsch et al. | |
| 6,415,941 | B1 | * | 7/2002 | Huse | 220/562 |
| 2004/0222543 | A1 | * | 11/2004 | Innerebner et al. | 264/102 |
| 2005/0194714 | A1 | * | 9/2005 | Nish et al. | 264/255 |

FOREIGN PATENT DOCUMENTS

| | | |
|---|---|---|
| JP | 11501880 T | 2/1999 |
| JP | 2005-026604 | 1/2005 |

* cited by examiner

*Primary Examiner* — Christina Johnson
*Assistant Examiner* — Saeed M Huda
(74) *Attorney, Agent, or Firm* — Birch Stewart Kolasch & Birch, LLP

(57) ABSTRACT

A pressing bag comprising silicone rubber sheets and uncured silicone members for covering a prepreg placed on a molding die to cure the prepreg in an evacuated state, the pressing bag being integrally molded in a shape in agreement with the molding die.

12 Claims, 5 Drawing Sheets

PRESSING BAG AND ITS PRODUCTION METHOD, AND METHOD FOR PRODUCING COMPOSITE BODY USING SUCH PRESSING BAG

FIELD OF THE INVENTION

The present invention relates to a pressing bag for use in the molding of resin composites such as prepreg sheets, etc., and its production method, and a method for molding a composite body using such a pressing bag.

BACKGROUND OF THE INVENTION

The molding of a composite body by using prepreg sheets generally comprises placing the prepreg sheets on a molding die, overlapping a parting film and a breather mat onto the prepreg sheets, covering them with a pressing bagging film, evacuating the pressing bagging film, and heating the prepreg sheets while pressing. The prepreg sheets are closely attached to the molding die by evacuation, so that they are cured in a shape in agreement with the die.

The pressing bagging film used for covering the prepreg sheets is not so extendable that the pressing bagging film should be provided with wrinkles in advance, to conduct the bagging of the prepreg sheets deformed to a shape along the molding die. Without sufficient wrinkles, too much tension may be applied to the pressing bagging film during evacuation, resulting in breakage. Thus, sufficient wrinkles are indispensable. The bagging is usually a manual operation, which is extremely complicated and thus costly. To produce a molded composite body with a complicated three-dimensional shape, the formation of wrinkles particularly takes time and skill. Further, because the bagging film is disposable, each molding costs the bagging film.

JP2001-47507A discloses a silicone rubber sheet used for molding a composite body in an autoclave, which is three-dimensionally shaped along the molded composite body in advance. To mold the composite body, a prepreg placed on a molding surface of a lower die part for producing the composite body is covered with a silicone rubber sheet, the silicone rubber sheet attached to the lower die part is evacuated, and the prepreg is cured by an autoclave method. The use of a silicone rubber sheet molded in advance makes it unnecessary to provide the bagging film with a three-dimensional shape with wrinkles, resulting in decrease in the number of steps. Because the silicone rubber sheet is reusable, this method is inexpensive.

However, the production of the molding silicone rubber sheet generally comprises attaching an uncured silicone rubber sheet to a wood die for exclusively molding the silicone rubber sheet, which is slightly larger than a lower die part for molding the composite body, and curing the uncured silicone rubber sheet. Thus, this method is costly because of needing the wood die. Because the curing of the silicone rubber causes shrinkage of about 2.5%, a composite body-molding die cannot be used to mold the silicone rubber sheet. In addition, much time and skill are needed to attach the uncured silicone rubber in uniform thickness to the wood die, resulting in high production cost. When an uncured silicone rubber is attached to a composite body produced by using a bagging film and cured in an autoclave, etc. as described in JP2001-47507A, the attaching operation of the silicone rubber is still needed despite that an exclusive molding die is not needed, and a composite body should be molded by using a bagging film in advance. In this case, too, many steps are needed, resulting in high cost.

OBJECTS OF THE INVENTION

Accordingly, an object of the present invention is to provide a method for producing a molded composite body at low cost with few numbers of steps, a pressing bag used for such molding, and a method for producing such a pressing bag.

DISCLOSURE OF THE INVENTION

As a result of intensive research in view of the above objects, it has been found that when a pressing bag constituted by silicone rubber sheets and uncured silicone members is used to cover a prepreg placed on a die to mold a composite body, (a) a molded composite body can be obtained without needing a complicated bagging operation, and (b) because the pressing bag is not substantially shrunken during curing, it can be integrally molded by using a die for molding the composite body without needing an exclusive die. The present invention has been completed based on these findings.

Thus, the pressing bag of the present invention comprises silicone rubber sheets and uncured silicone members for covering a prepreg placed on a molding die to cure the prepreg in an evacuated state, the pressing bag being integrally molded in a shape substantially in agreement with the molding die.

The three-dimensionally curved portions and/or corners of the pressing bag are preferably constituted by the uncured silicone members.

The method for producing a pressing bag according to the present invention comprises placing silicone rubber sheets and uncured silicone members to form their assembly on a surface of a die for molding a composite body, covering the assembly with a bagging film, and evacuating the bagging film to integrally mold the assembly.

The uncured silicone members are preferably placed on three-dimensionally curved portions and/or corners of the die, and the silicone rubber sheets are preferably placed on flat portions of the die.

The method for producing a molded composite body according to the present invention comprises placing a prepreg on a die, covering the prepreg with a pressing bag, evacuating the pressing bag, and curing the prepreg in a pressed state, the pressing bag being obtained by placing silicone rubber sheets and uncured silicone members on a surface of the die to form their assembly, covering the assembly with a bagging film, evacuating the bagging film to integrally mold the assembly.

In the production of the pressing bag, the uncured silicone members are preferably placed on three-dimensionally curved portions and/or corners of the die, and the silicone rubber sheets are preferably placed on flat portions of the die.

DESCRIPTION OF THE PREFERRED EMBODIMENTS

[1] Pressing Bag

Figure 1A:
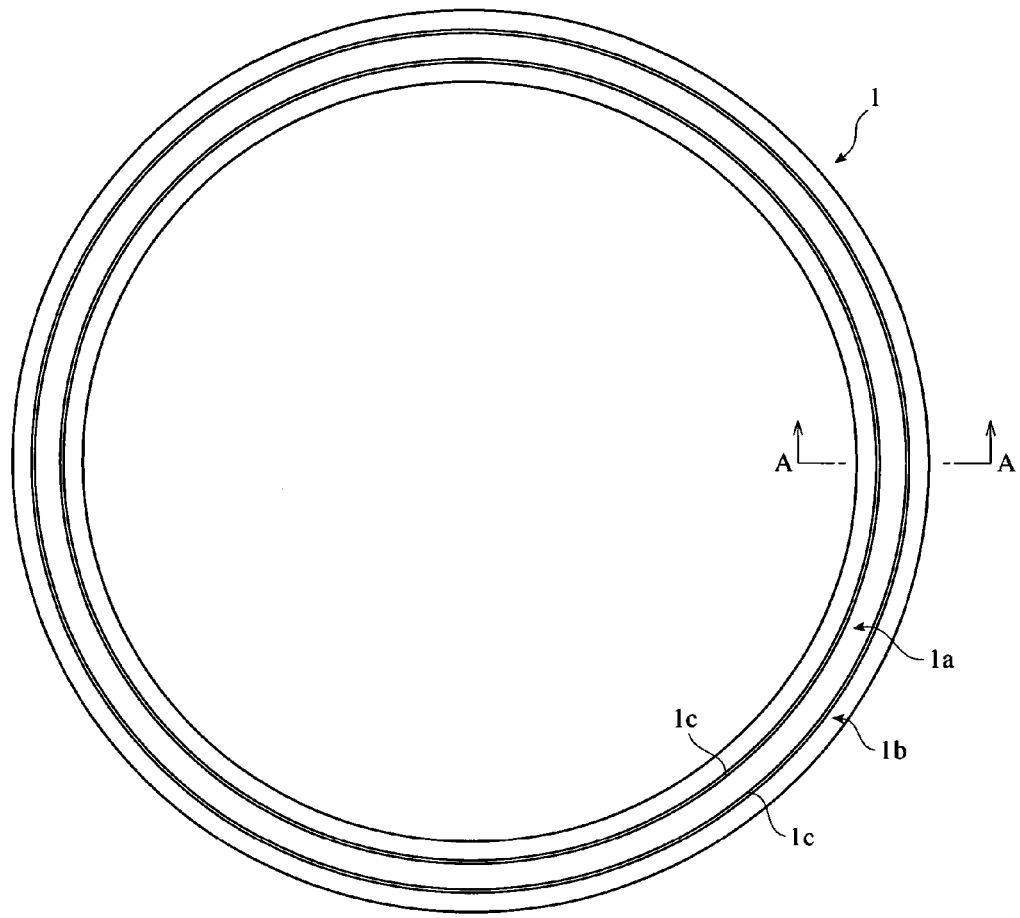
FIG. 1(a) is a plan view showing one example of the pressing bag of the present invention.
Figure 1B:
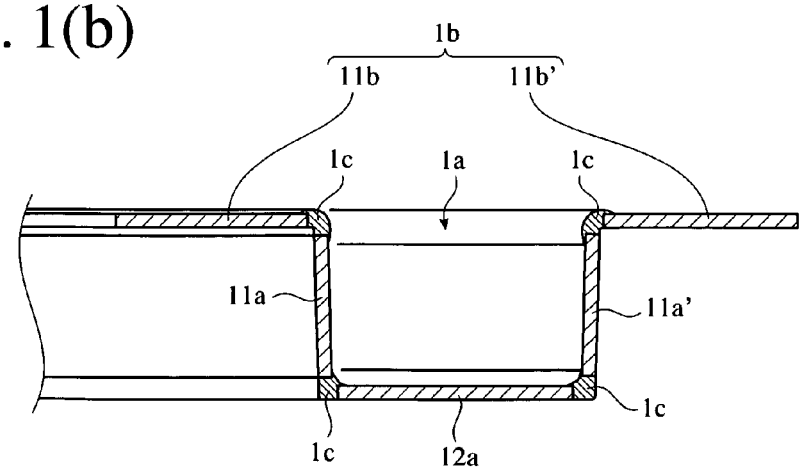
FIG. 1(b) is an enlarged cross-sectional view taken along the line A-A in FIG. 1(a).

FIGS. 1(a) and 1(b) show an example of the pressing bag 1 of the present invention, which is an annular pressing bag comprising a die portion 1a having a U-shaped cross section, and flanges 1b (inner and outer flanges 11b, 11b') extending from upper ends of the die portion 1a.

Flat portions of the pressing bag 1 comprising inner and outer sidewalls 11a, 11a' and a bottom wall 12a of the die portion 1a, and inner and outer flanges 11b, 11b' are formed by silicone rubber sheets. Corner portions 1c of the pressing bag 1 between the sidewalls 11a, 11a' and the bottom wall 12a and between the sidewalls 11a, 11a' and the inner and outer flanges 11b, 11b' are constituted by uncured silicone members. An uncured silicone member at each corner 1c is shaped in agreement with a molding die. Though the silicone rubber sheet is easily two-dimensionally curved, it is not easily formed into a three-dimensional shape with corners 1c of a right, obtuse or acute angle. On the other hand, the uncured silicone member is easily formed into a desired shape with a corner of any angle because of extreme softness. Accordingly, the corners 1c are preferably made of uncured silicone. The corners 1c may have a right, obtuse or acute angle. The pressing bag 1 may have three-dimensionally curved portions, which are preferably made of uncured silicone.

The silicone rubber sheet may be a usual cured silicone rubber sheet. The silicone rubber sheet is preferably as thick as 0.5-3 mm. When it is thinner than 0.5 mm, the pressing bag 1 is easily bent, failing to fully keep its three-dimensional shape. When it exceeds 3 mm, the pressing bag 1 is too high in a material cost, and takes too much time for integral molding.

The uncured silicone members are not particularly restricted, as long as they are thermally curable. The uncured silicone members in the pressing bag 1 are preferably as thick as 0.5-3 mm. When they are thinner than 0.5 mm, the corners 1c have too small strength to keep the three-dimensional shape of the pressing bag 1. In addition, the uncured silicone members are preferably 100-200% as thick as the silicone rubber sheets. When the thickness of the uncured silicone members is less than 100% of that of the silicone rubber sheets, the pressing bag 1 does not have sufficient mechanical strength. When it exceeds 200%, there is too much raggedness between the uncured silicone members and the silicone rubber sheets.

Figure 2A:
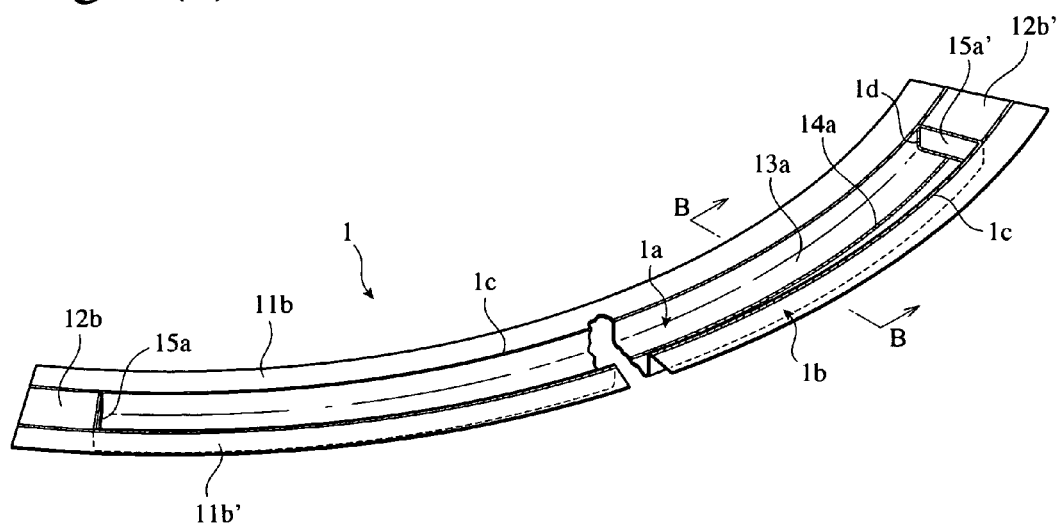
FIG. 2(a) is a perspective view showing another example of the pressing bag of the present invention.
Figure 2B:
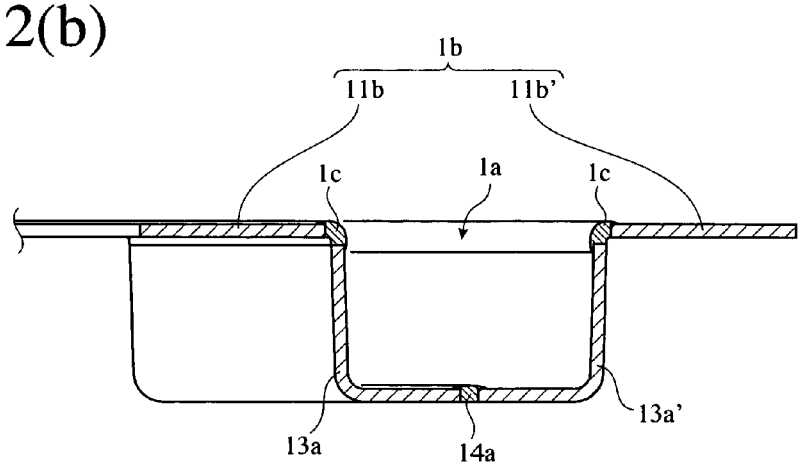
FIG. 2(b) is an enlarged cross-sectional view taken along the line B-B in FIG. 2(a).

FIG. 2 shows another example of the pressing bag 1 of the present invention. Because the pressing bag 1 shown in FIG. 2 is substantially the same as shown in FIG. 1 except that the former has an arcuate shape, only differences will be explained below. As shown in FIG. 2(b), a die portion 1a having a U-shaped cross section comprises inner and outer L-shaped sheets 13a, 13a', which are radially opposing each other.

A connection 14a of the L-shaped sheets 13a, 13a', which is constituted by an uncured silicone member, extends longitudinally at the bottom of the die portion 1a. Flat flanges 11b, 11b' and flat portions of the die portion 1a (sidewalls and a bottom wall) need not be constituted by one silicone rubber sheet, but may be constituted by pluralities of silicone rubber sheets connected via uncured silicone members. Because sufficiently soft uncured silicone members enter into gaps between the silicone rubber sheets to be connected, the pressing bag 1 with the silicone rubber sheets bonded via the uncured silicone members has a smooth surface.

The end walls 15a, 15a' are connected to both longitudinal ends of the L-shaped sheets 13a, 13a' by uncured silicone members 1d, 1d [only one reference numeral is shown in FIG. 2(a)]. Because the uncured silicone members 1d, 1d are easily deformed in agreement with a molding die, there are clear corners between the end walls 15a, 15a' and the L-shaped sheets 13a, 13a' as shown in FIG. 2(a). An upper flat surface of the pressing bag 1 is constituted by flanges 1b (inner and outer flanges 11b, 11b') and a pair of arcuate sheets 12b, 12b' bonded to the flanges 11b, 11b' and the end walls 15a, 15a' by uncured silicone members.

Figure 3A:
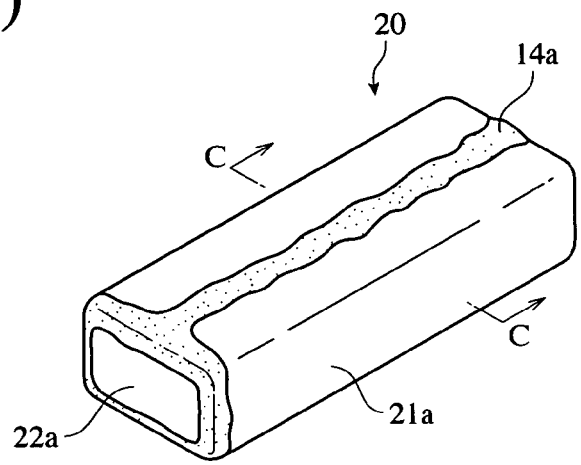
FIG. 3(a) is a perspective view showing a further example of the pressing bag of the present invention.
Figure 3B:
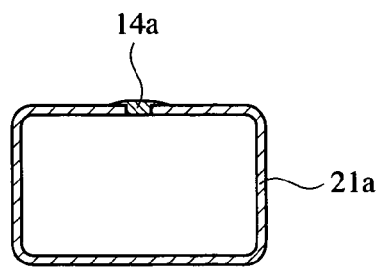
FIG. 3(b) is a cross-sectional view taken along the line C-C in FIG. 3(a).
Figure 3C:
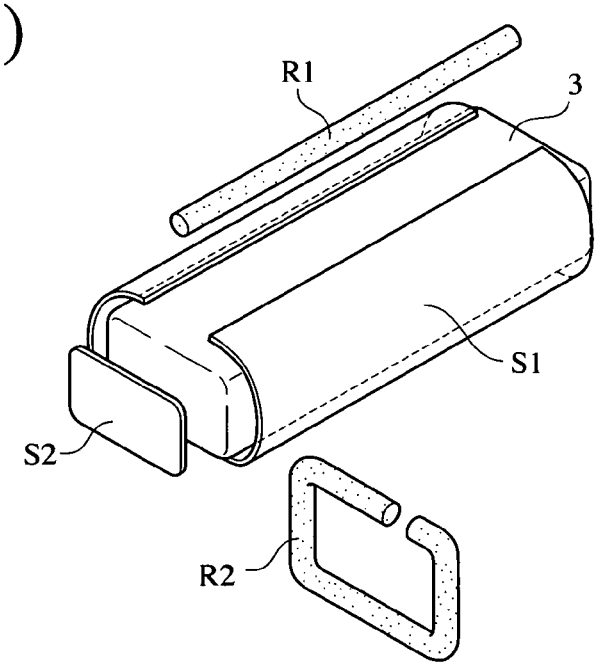
FIG. 3(c) is a perspective view showing an assembly of silicone rubber sheets and uncured silicone members.

FIG. 3 shows a further example of the pressing bag of the present invention. This pressing bag 20 comprises cylindrical sidewall 21a, and an end wall 22a sealing an end of the sidewall 21a. The sidewall 21a may be formed to a substantially rectangular shape as shown in FIG. 3(b). As shown in FIG. 3(c), this pressing bag 20 is formed by attaching a first silicone rubber sheet S1 as the sidewall 21a around a rectangular-parallelepiped molding die 3 in a cylindrical shape, with both ends connected by an uncured silicone member R1, and bonding a second silicone rubber sheet S2 as the end wall 22a to one end surface of the molding die 3 by a circular uncured silicone member R2.

The connection 14a constituted by the uncured silicone member R1 may extend longitudinally along a surface of the molding die 3 as shown in FIGS. 3(a) and 3(b), or along a longer side of the rectangular-parallelepiped molding die 3. The connection 14a is preferably 100-200% as thick as the silicone rubber sheet. Each uncured silicone member is preferably not too large relative to each silicone rubber sheet. When the uncured silicone members have too large surface areas, the pressing bag. undesirably shrinks too much by heating.

Using the pressing bag 20 and the molding die 3 as shown in FIG. 3, it is easy to produce hard cases for cell phones, portable audio appliances, etc., and cigarette cases.

Figure 4A:
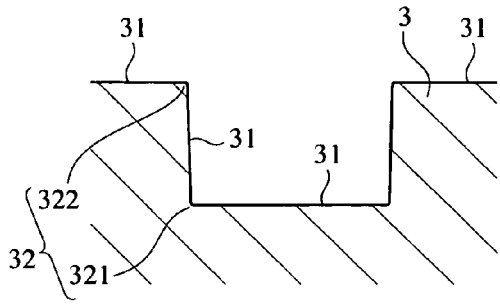
FIG. 4(a) is a partial, enlarged cross-sectional view showing a die for molding the pressing bag shown in FIG. 1 and a composite body.
Figure 4B:
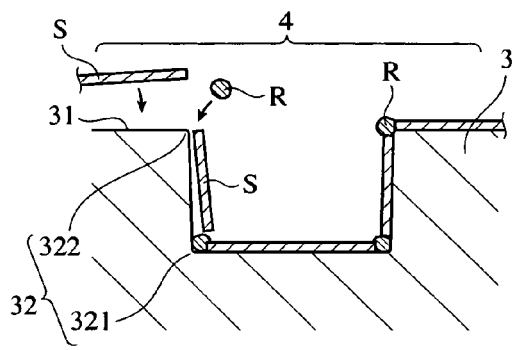
FIG. 4(b) is a partial, enlarged cross-sectional view showing a molding die in which silicone rubber sheets and uncured silicone members are placed.

Taking the pressing bag 1 shown in FIG. 1 for example, the production method of the pressing bag 1 will be explained. FIG. 4(a) shows a die for molding both of the pressing bag 1 and a composite body 2. Silicone rubber sheets S are placed on flat portions 31 of this molding die 3, and uncured silicone members R are placed at corners 32 (concave corners 321 and convex corners 322) of the die 3 to form an assembly 4 comprising silicone rubber sheets S and uncured silicone members R [FIG. 4(b)]. When the molding die 3 is made of wood, the silicone rubber sheets S and the uncured silicone members R are placed on the molding die 3 after a Teflon tape or aluminum foil (not shown) is attached to a die surface, so that a molded pressing bag 1 obtained from the assembly 4 can be easily removed from the molding die 3. In the case of a metal die, the silicone rubber sheets S and the uncured silicone members R may be placed on the die 3 without any treatment thereon.

Figure 5A:
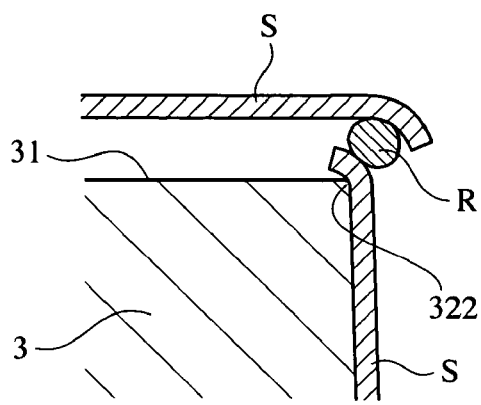
FIG. 5(a) is a partial, enlarged cross-sectional view showing silicone rubber sheets and an uncured silicone member disposed therebetween at their corners.
Figure 5B:
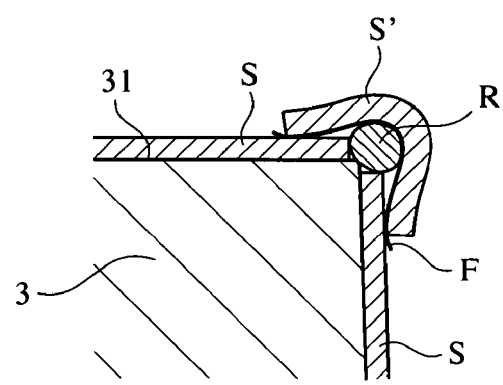
FIG. 5(b) is a partial, enlarged cross-sectional view showing an uncured silicone member disposed at a corner of a die in a gap between silicone rubber sheets and covered with an additional silicone rubber sheet.

Cord-like or rod-like uncured silicone members R may be placed at concave corners 321. Proper measures may preferably be taken to avoid the uncured silicone members R at the convex corners 322 from becoming too thin by evacuation. As shown in FIG. 5(a), for instance, adjacent silicone rubber sheets S, S may be overlapped at ends, with an uncured silicone member R sandwiched therebetween. Alternatively, as shown in FIG. 5(b), another silicone rubber sheet S' may be overlapped via a release film F on an uncured silicone member R placed in a gap between the adjacent silicone rubber sheets S, S, the silicone rubber sheet S' being removed after molding.

Figure 4C:
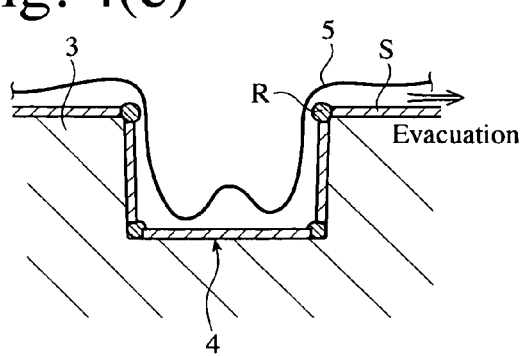
FIG. 4(c) is a partial, enlarged cross-sectional view showing an assembly of silicone rubber sheets and uncured silicone members, which is covered with an evacuating film.
Figure 4D:
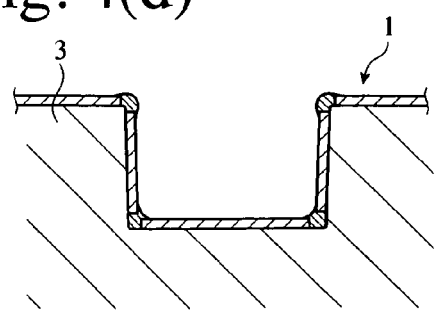
FIG. 4(d) is a partial, enlarged cross-sectional view showing a heat-cured pressing bag in a molding die.

As shown in FIG. 4(c), the assembly 4 constituted by the silicone rubber sheets S and the uncured silicone members R is covered with an evacuating film 5. While evacuating between the evacuating film 5 and the molding die 3, the assembly 4 is heated to cure the uncured silicone members R, thereby obtaining a pressing bag 1 [FIG. 4(d)]. The film 5 is closely attached to the assembly 4 by evacuation, so that the uncured silicone members R are flattened to fill gaps between the silicone rubber sheets S. As a result, surfaces of the uncured silicone members R in contact with the molding die 3, which are simply called "contact surfaces," are made flat. These contact surfaces are brought into contact with a prepreg 6 placed in the die 3, affecting finished surfaces of a molded composite body obtained from the prepreg 6. The flatness of the contact surfaces is thus important. Dented or wrinkled contact surfaces are undesirable, because prepreg resins are easily accumulated there.

Though an autoclave may be used to mold the assembly 4, a heating furnace is preferably usable. Because the assembly 4 mostly constituted by the silicone rubber sheets is already uniform in thickness, large pressure is not needed for curing, so that heating in a furnace is sufficient.

Figure 4E:
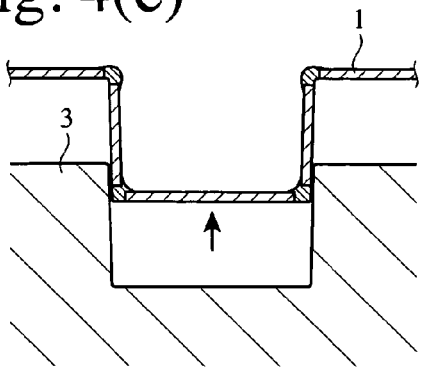
FIG. 4(e) is a partial, enlarged cross-sectional view showing a pressing bag, which is being removed from a molding die.

The pressing bag 1 mostly constituted by the silicone rubber sheets is not substantially shrunk by heat-curing. Accordingly, the same molding die 3 as used for forming the pressing bag 1 [FIG. 4(e)] may be used to mold the composite body 2. The integrally molded pressing bag 1 is preferably provided in its flat portions with one or more evacuation openings (not shown) for molding the composite body 2.

Figure 4F:
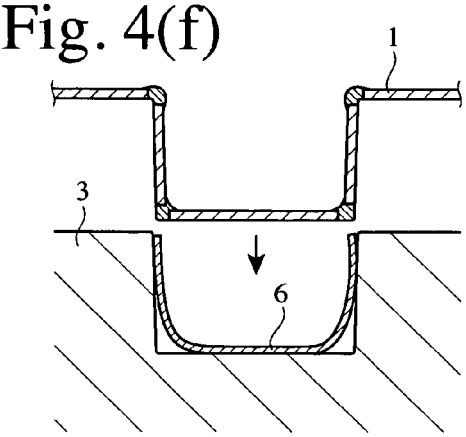
FIG. 4(f) is a partial, enlarged cross-sectional view showing a prepreg placed on a molding die, which is being covered with a pressing bag.
Figure 4G:
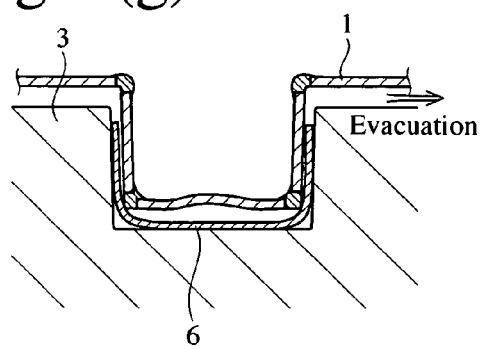
FIG. 4(g) is a partial, enlarged cross-sectional view showing a prepreg overlapped by a pressing bag.
Figure 4H:
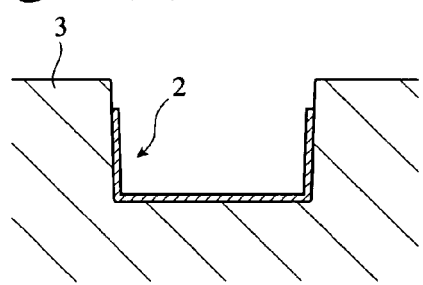
FIG. 4(h) is a partial, enlarged cross-sectional view showing a cured composite body in a molding die.

The molding of the composite body 2 using the pressing bag 1 shown in FIG. 1 is then explained. A prepreg 6 is placed on the molding die 3, and the pressing bag 1 is then overlapped thereon [FIG. 4(f)]. The pressing bag 1 is preferably overlapped via a release film (not shown), because of easiness of peeling after molding. Because the pressing bag 1 is made of an extendable silicone rubber, it can be inserted into a cavity of the die 3 even with the prepreg 6 therein. While evacuating between the pressing bag 1 and the molding die 3 [FIG. 4(g)], a resin in the prepreg 6 is cured. The silicone rubber sheets are closely attached to the prepreg 6 by evacuation. The flexible, extendable pressing bag 1 can cover the prepreg 6 without applying a force, even though it is slightly different in shape from the die cavity.

Because the pressing bag 1 is shaped in agreement with the molding die 3, mere evacuation between the pressing bag 1 and the molding die 3 causes the prepreg 6 to be deformed along the molding die 3. The resultant molded composite body 2 can be in a shape in agreement with the molding die 3, (a) by placing the die 3 having the pressing bag 1 and the prepreg 6 in its cavity in an autoclave, evacuating a gap between the pressing bag 1 and the die 3, and heating the prepreg 6 under pressure, or (b) by placing the die 3 having the pressing bag 1 and the prepreg 6 in its cavity in a furnace, evacuating a gap between the pressing bag 1 and the die 3, and heating the prepreg 6. Particularly when a large composite body 2 is molded, the use of a heating furnace without needing an autoclave is preferable. Though different to some extent depending on the types of thermosetting or thermoplastic resins contained in the prepreg, the heating temperature is preferably 120-180° C. In the case of using an autoclave, pressure is preferably about 3-6 MPa.

The prepreg 6 is constituted by reinforcing fibers such as carbon fibers, aramide fibers, glass fibers or boron fibers, or their woven or non-woven fabrics, which are impregnated with matrix resins such as thermosetting resins. From the aspect of strength, the reinforcing fibers are preferably in the form of woven fabrics. The thermosetting resins are preferably epoxy resins, polyurethanes, unsaturated polyesters, etc.

A preferred example of the prepreg is a carbon fiber composite constituted by carbon fibers and the above resins. From the aspect of mechanical strength and heat resistance, the prepreg may be constituted by carbon fibers and epoxy resins.

EFFECT OF THE INVENTION

The present invention provides a pressing bag with a uniform thickness by using silicone rubber sheets without needing a complicated operation of laying uncured silicone sheets. The method of the present invention is free from the problem of molding defects. With uncured silicone members disposed at corners and curved portions, a pressing bag with a complicated three-dimensional shape can be obtained.

Silicone rubber sheets are not substantially shrunken by heating an assembly of silicone rubber sheets and uncured silicone members in the production of a pressing bag. The pressing bag can be produced by using a die for molding a composite body, without needing a die for exclusively molding a pressing bag. Accordingly, the pressing bag can be produced at a low cost.

The pressing bag integrally molded in a shape in agreement with the shape of the molding die can be used as an evacuating film for molding a composite body. As a result, the composite body can be molded at a low cost without needing much skill and time.

What is claimed is:
1. A method for producing a pressing bag for use in the production of a molded composite body, comprising:
arranging individual silicone rubber sheets adjacent to each other on a molding die for molding said composite body so that gaps are provided between peripheral edges of each of the adjacent silicone rubber sheets, placing a single rod-shaped or cord-shaped uncured silicone member in each of the gaps between the peripheral edges of the adjacent silicone rubber sheets to form an assembly on a surface of the molding die, wherein each corner of the assembly is made of the uncured silicone member, covering said assembly with a bagging film, and evacuating said bagging film to integrally mold said assembly.

2. The method for producing a pressing bag according to claim 1, wherein said uncured silicone members are placed on three-dimensionally curved portions and/or corners of said molding die, and said silicone rubber sheets are placed on flat portions of said molding die.

3. The method for producing a pressing bag according to claim 1, wherein the uncured silicone members have thicknesses that are greater than thicknesses of the silicon rubber sheets.

4. A method for producing a pressing bag for use in the production of a molded composite body, comprising:

placing silicone rubber sheets to form an assembly on a surface of a die for molding said composite body, covering said assembly with a bagging film, and evacuating said bagging film to integrally mold said assembly, wherein the uncured silicone members are placed in gaps between peripheral edges of adjacent silicone rubber sheets, and wherein the silicone rubber members have thicknesses in a range of 0.5- 3 mm, and the thickness of each the uncured silicone members is 6 mm or less, so that a maximum amount by which each of the uncured silicone members overlaps a surface of any specific one of the silicone rubber members is limited to 6 mm minus the width of the gap between the specific silicone rubber member and the adjacent silicone rubber member, wherein the peripheral edges of at least two of the silicone rubber members located adjacent to each other are substantially perpendicular to each other, so that the uncured silicone member placed in the gap between the two silicone rubber members joins the two silicone rubber members at an angle of substantially 90°.

5. The method for producing a pressing bag according to claim 1, wherein at least one of the silicone rubber sheets is arc-shaped.

6. The method for producing a pressing bag according to claim 1, wherein the pressing bag formed with the adjacent silicone rubber sheets bonded via the uncured silicone members has a smooth surface.

7. The method for producing a pressing bag according to claim 1, wherein the die is cylindrically-shaped.

8. The method for producing a pressing bag according to claim 1, where in the die has the shape of a circular trough.

9. The method for producing a pressing bag according to claim 1, wherein the silicone rubber sheets are disposed on inner side walls, and a bottom wall of the die.

10. The method for producing a pressing bag according to claim 1, wherein the silicone rubber members have thicknesses in a range of 0.5-3 mm, and the thickness of each the uncured silicone members is between 100% and 200% of the thickness of the silicone rubber members.

11. The method for producing a pressing bag according to claim 1, wherein the die is a female die, and a prepreg is provided between the die and the assembly.

12. The method for producing a pressing bag according to claim 4, wherein the peripheral edge portion of a third one of the adjacent silicone rubber sheets overlaps the peripheral edge portion of a fourth one of the adjacent silicone rubber sheets, and one of the uncured silicone members is disposed in the gap between the overlapping peripheral edge portions.

* * * * *